(No Model.)
F. H. BOLTE.
BICYCLE.
No. 571,941. Patented Nov. 24, 1896.
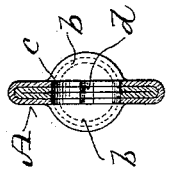
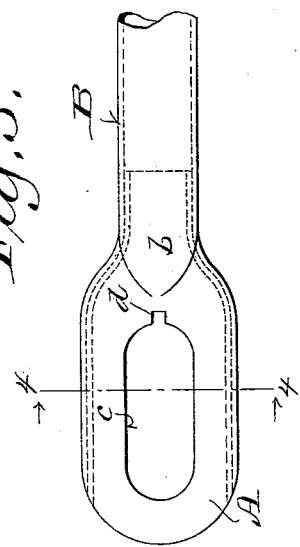
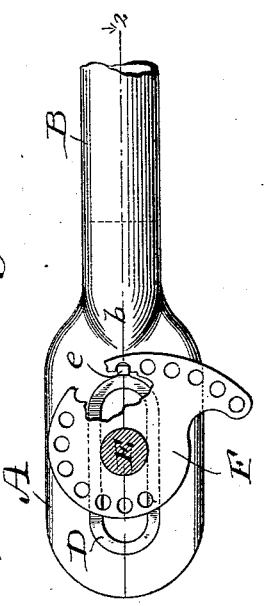
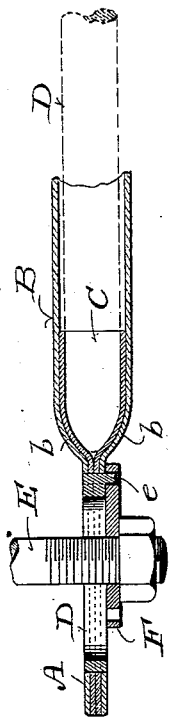
Witnesses:
Geo. W. Tony
N. E. Oliphant
Inventor:
Frank H. Bolte
By H. G. Underwood
Attorneys

UNITED STATES PATENT OFFICE.

FRANK H. BOLTE, OF MILWAUKEE, WISCONSIN, ASSIGNOR TO THE BOLTE CYCLE MANUFACTURING COMPANY, OF SAME PLACE.

BICYCLE.

SPECIFICATION forming part of Letters Patent No. 571,941, dated November 24, 1896.

Application filed September 28, 1895. Serial No. 563,973. (No model.)

*To all whom it may concern:*

Be it known that I, FRANK H. BOLTE, a citizen of the United States, and a resident of Milwaukee, in the county of Milwaukee and State of Wisconsin, have invented certain new and useful Improvements in Bicycles; and I do hereby declare that the following is a full, clear, and exact description thereof.

My invention has for its object to cheapen the manufacture of bicycles, as well as to provide for a positive even adjustment of the rear wheel of such a vehicle when taking up slack of the drive-chain; and it consists in certain peculiarities of construction and combination of parts hereinafter described, with reference to the accompanying drawings, and subsequently claimed.

In the drawings, Figure 1 represents a side elevation of a portion of a bicycle embodying my improvements; Fig. 2, a horizontal section on line 2 2 of Fig. 1, a mandrel partly illustrated by dotted lines being included in said figure; Fig. 3, a side elevation of so much of the bicycle as comprehends a rear-axle hanger and its supporting-tube in accordance with my invention, and Fig. 4 a section taken on line 4 4 of Fig. 3.

Referring by letter to the drawings, A represents a rear-axle hanger of a bicycle, and B its supporting-tube, the blank for said hanger resulting from a swaging together of the rear ends of said tube and another tube C inserted therein. In practice, the tube C being inserted in the tube B far enough to bring the rear ends of both tubes into register, a round taper-pointed rod or mandrel D is run in from the front end of tube B to partly fill the inner tube C, after which both tubes are swaged together in rear of the mandrel, and thus I provide for a taper swell *b* on each side of the axle-hanger, as best illustrated in Fig. 1. The employment of the taper-pointed mandrel is only preferable in order to obtain the best and most pleasing result.

By swaging of two tubes together to produce a blank for the axle-hanger the more expensive operation of brazing an axle-hanger to its supporting-tube is avoided and a stronger as well as a more durable joint is obtained.

The blank having been formed, as above described, a longitudinal slot *c* is punched therein to complete my improved axle-hanger in its most primitive form; but as herein shown I may provide the hanger with a notch *d*, intercepting the slot, and line the latter with a steel bushing D, having an upset laterally-extending prong *e*, that engages said notch. The bushing D is engaged by the rear axle E of the bicycle, and an eccentric curvilinear washer F, loose on said axle, is shown provided with a series of perforations at regular intervals parallel to its contour, these perforations being for the engagement of the lateral prong *e* on said bushing. If found preferable, the washer F may have notches in its contour for the same purpose as the perforations herein shown and described.

On a bicycle the set of the washers F, with respect to the bushing-prongs *e*, regulates the adjustment of the axle E in its hangers, and consequently governs the tension of the drive-chain. Hence it is essential that the distance between the axle center and said prongs be the same on both sides of the machine, a result that is difficult to accurately accomplish when the axle-hangers have to be measured and bored for the reception of a stud or screw. By my construction and arrangement of parts the bushing-prongs or washer-stops *e* are positively set in proper position on both sides of the bicycle and much expensive handwork avoided; but it is obvious that said stops may be otherwise than upset parts of the bushings.

Having now fully described my invention, what I claim as new, and desire to secure by Letters Patent, is—

1. A bicycle axle-hanger that results from engagement of two tubes differential as to length, the inner one being shortest but registered at its outer end with an end of the other, a swaging together of both tubes for a distance from their registered ends less than the length of said inner one, and a longitudinal slotting of the blank obtained by the swaging operation.

2. A bicycle axle-hanger that results from engagement of two tubes differential as to length, the inner one being shortest but registered at its outer end with an end of the other, a swaging together of both tubes for a distance from their registered ends less than the length of said inner one, a longitudinal slotting of the blank obtained by the swaging operation, a notching of said blank to intercept the slot therein and the engagement of said slot with a bushing having a prong that engages said notch.

3. A bicycle axle-hanger having a notch intercepting its longitudinal slot and a bushing for the slot provided with a prong that engaging said notch extends laterally from the hanger, in combination with an eccentric curvilinear axle-engaging washer provided with a series of prong-receivers corresponding in arrangement to its contour.

In testimony that I claim the foregoing I have hereunto set my hand, at Milwaukee, in the county of Milwaukee and State of Wisconsin, in the presence of two witnesses.

F. H. BOLTE.

Witnesses:
N. E. OLIPHANT,
B. C. ROLOFF.